Patented Sept. 9, 1941

2,255,597

UNITED STATES PATENT OFFICE 2,255,597

STABILIZATION OF ORGANIC SUBSTANCES

Frederick B. Downing and Charles J. Pedersen, Penns Grove, N. J., assignors to E. I. du Pont de Nemours & Company, Wilmington, Del., a corporation of Delaware No Drawing. Application November 10, 1939, Serial No. 303,812

30 Claims. (Cl. 44—9)

This invention relates to the stabilization of organic substances, and particularly to the protection of organic substances against the deleterious action of oxygen catalyzed by the presence of copper and its compounds, and more particularly to the preservation of oxidizable mineral hydrocarbons containing or in contact with copper and its compounds.

Oxidation reactions, which are initiated or modified by the presence of a catalyst, may be conveniently divided into two classes:

(1) Those caused by molecular oxygen, and
(2) Those caused by oxidizing agents.

Reactions of the first class occur continuously and spontaneously because oxygen is ubiquitous. In the following discussion, the term "oxidation" refers only to those reactions involving molecular oxygen including, however, the intermediate compounds formed which are capable of effecting further oxidation.

Many organic products, such as fats, edible oils, vegetable juices, textile fibres, petroleum products, rubber, photographic developers and synthetic unsaturated compounds, are readily attacked by oxygen and the resulting deterioration, whether due to the accumulation of oxidation products or to disaggregation or polymerization induced by the primary oxidation products, imparts undesirable qualities to them and eventually destroys their usefulness.

The oxidation of these products is promoted by:

(1) Autogenous catalysts formed by the oxidation of the products themselves, and
(2) Extraneous catalysts which are accidentally present in the products.

The autogenous catalysts, generally considered to be peroxides or moloxides, functioning through the mechanism of branch-chain-reaction, are responsible for the phenomenon termed "auto-oxidation", wherein the reaction proceeds very slowly at first but gradually accelerates until a maximum is reached. The initial period of negligible reaction rate is called the induction period. Since these catalysts are integral constituents of the oxidation system, the particular process of oxidation cannot occur in their absence, and, being derivatives of the products, they are variable and possess different chemical properties.

On the other hand, the extraneous catalysts, restricted in this discussion to copper and its compounds, do not occur of necessity in any organic product which is not a derivative of copper, although they may be accidentally present in any product. The catalytic activity of copper is inherent and is possessed by it in any medium unless the activity has been modified or suppressed by chemical means.

It has been found that certain compounds, known as antioxidants, retard the purely autocatalytic process, while some compounds, herein named copper deactivators, suppress the catalytic activity of copper and its compounds. The nature and the action of antioxidants and copper deactivators will be described below, but, without further discussion, it may be concluded from the facts presented above that antioxidants must be specific with respect to the oxidizable organic product and that deactivators must be specific for copper and independent of the medium. Certain factors, however, such as very low pH and insolubility, will determine whether a given deactivator can or cannot be used in a particular system.

Signal success has been achieved in recent years in the preservation of many organic products by the discovery and use of compounds generally called "oxidation inhibitors" or "antioxidants". These agents, mostly oxidizable organic compounds, retard the auto-catalytic process. Since antioxidants are themselves oxidizable, the beneficial effect obtained by their use is not permanent, and they protect the organic products only so long as they are not rendered inactive. They are, moreover, very specific in action, each group of auto-oxidizable products requiring a different type of antioxidant for the best results.

Copper and its salts accelerate the oxidation of many organic substances, including most of the antioxidants. It is well known that copper promotes the formation of gum in gasoline, and speeds up the aging of rubber and the development of rancidity in fats and oils. Hence, copper and antioxidants are antagonistic in action, and the normal inhibiting effect of the latter is greatly reduced in the presence of the former.

Copper occurs naturally in many organic products, but usually in such slight traces as to cause very little harm. The concentration of copper, however, is frequently raised during the course of handling and utilizing the products: vessels and conduits made of metals containing copper are used for storage and transportation; ingredients contaminated with copper might be added; copper might actually be required in one of the steps in the process for manufacture as in the copper sweetening of gasoline.

The harm done by copper and its salts may be prevented by at least three methods:

(1) The removal of copper by purification, but often this is impossible of accomplishment and usually too costly to be economically feasible, (2) The addition of a sufficient amount of an antioxidant so that its preserving effect is equal or greater than the prooxidant effect of the copper present, but, as will be shown later, the antioxidant efficiency is so greatly diminished by the copper that the advantage gained under this circumstance is seldom worth the cost of the increased quantity of antioxidant required for adequate stabilization, and (3) The suppression of the catalytic activity of copper by chemical means without physically removing the copper from the system.

Compounds capable of effectively suppressing the catalytic activity of copper and its salts have been found and have been named copper deactivators. Their use in the preservation of organic products containing or in contact with copper and its salts through methods (3), and (3) in combination with (2) is the object of this invention.

While the so-called "antioxidants" are specific to the type of organic substance, it has been found that copper deactivators are specific for copper and its compounds and are independent of the organic substance. In so far as the organic substance to be stabilized is concerned, the only requirements are that the copper deactivator be soluble therein and that the organic substance be not strongly acid so as to destroy the copper deactivator compound.

An object of the present invention is to retard the deterioration of organic substances caused by the action of molecular oxygen and promoted by the presence of copper and its compounds. Another object is to provide a class of organic compounds which, when added to an organic substance normally subject to deterioration by oxygen in the presence of copper and its compounds, will suppress the activity of the copper or its compounds. A further object is to provide a method for rendering antioxidants more effective for the preservation of organic substances in the presence of copper and its compounds. A still further object is to provide a class of organic compounds which, when added to an organic substance in the presence of an antioxidant and in the presence of copper or its compounds, increases the efficiency of the antioxidant. Still further objects are to inhibit the formation of color, acids, gum, sludge and the like in liquid petroleum hydrocarbons containing or in contact with copper or its compounds. Other objects are to provide new compositions of matter and to advance the art. Still other objects will appear hereinafter.

The above and other objects may be accomplished in accordance with our invention which comprises incorporating, in organic substances which are subject to deterioration normally caused by oxygen in the presence of copper and its compounds, organic compounds of the type of a di-(o-hydroxy aromatic ketone) aliphatic diamine in which the nitrogens are each doubly bonded to the carbonyl carbon of the ketone group and singly bonded to aliphatic carbon atoms of the aliphatic group. These compounds are obtained by condensing one mol of an aliphatic polyamine, containing two primary amino groups, with two mols of an o-hydroxy substituted aromatic ketone, so that one and only one mol of ketone reacts for each primary amino group of the amine.

The polyamine may be any aliphatic amine containing two primary amino groups directly attached to different aliphatic carbon atoms of the same open chain and which amine may contain aromatic, heterocyclic, alkoxy, aryloxy, halogen, hydroxyl, secondary amino or tertiary amino groups substituted on the chain, but, preferably, should be free of strongly acidic groups such as sulfonic and sulfuric acid groups. The term "aliphatic polyamine," as employed hereinafter and in the claims, will be understood to have the foregoing meaning. The preferred polyamines are the alkylene diamines, consisting of carbon, hydrogen and nitrogen and particularly those in which the primary amino groups are directly attached to adjacent carbon atoms, such as ethylenediamine, 1,2-propylenediamine and 3,4-diaminohexane.

By "adjacent atoms," we mean atoms directly bonded together. By the term "alkylene diamine," we mean compounds which, except for the amino nitrogens, consist of saturated aliphatic hydrocarbons containing no aromatic rings.

By the terms "o-hydroxy aromatic ketone" and "2-hydroxy aromatic ketone," we mean those in which the hydroxy group and the keto, or

group are directly bonded to adjacent ring carbon atoms of a benzine ring. By the terms "o-hydroxy aryl ketone" and "2-hydroxyl aryl ketone," we intend to include only those ketones which, except for the OH and

groups, consist of carbon and hydrogen. By the term "a di-(o-hydroxy phenone)," we mean those of the benzene series containing only one benzene ring.

The ketone is preferably an aromatic ketone and also preferably an o-hydroxy aryl ketone. Of these the mixed alkyl-(o-hydroxy-aryl ketones), in which the alkyl group contains up to 6 carbon atoms, are the most desirable. By the terms "mixed aliphatic-aromatic ketone" and "mixed alkyl-aryl ketone" we mean those in which one valence of the

group is satisfied by an aliphatic or alkyl group and the other valence is satisfied by a ring carbon atom of a benzene ring in an aromatic or aryl group, as the case may be. However, the ketones may contain, as substituents, alkoxy, aryloxy, halogen, heterocyclic, amino, cyano and nitro groups, as well as hydroxy, alkyl and aryl radicals, but, preferably should be free of strongly acidic groups such as sulfonic and sulfuric acid groups.

Amongst the compounds which we have found to be particularly effective are:

Di-(2-hydroxy acetophenone) ethylenediamine

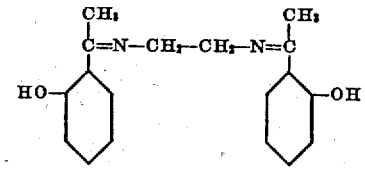

Di-(2-hydroxy-5-methyl-acetophenone)ethylenediamine

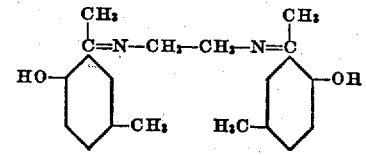

Di-(2-hydroxy-4-methyl-acetophenone)ethylenediamine

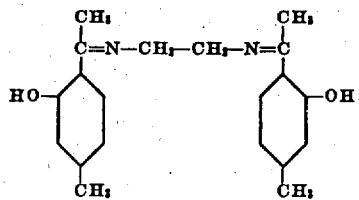

Di-(2-hydroxy-propiophenone)ethylenediamine

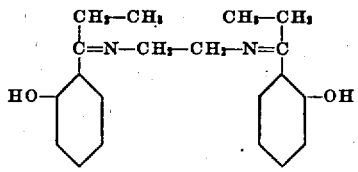

Di-(2-hydroxy-5-methyl-acetophenone)1,2-propylenediamine

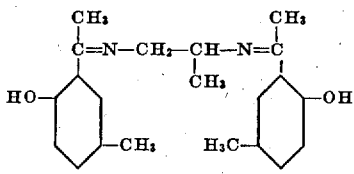

Di-(2-hydroxy-5-methyl-acetophenone)diethylenetriamine

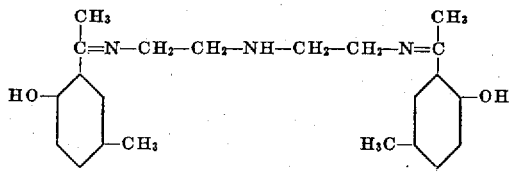

Di-(2-hydroxy-5-methyl-acetophenone)1,3-diamino-propanol-2

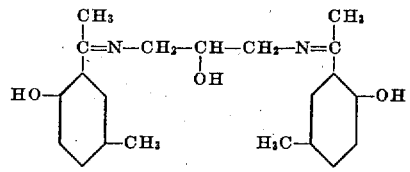

Di-(2-hydroxy-5-methyl-acetophenone)1,3-diamino-2-methyl-propanol-2

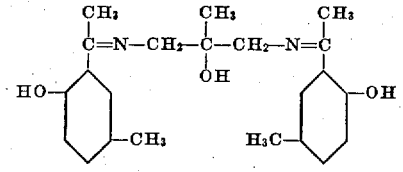

Di-(2-hydroxy-propiophenone)1,2-propylenediamine

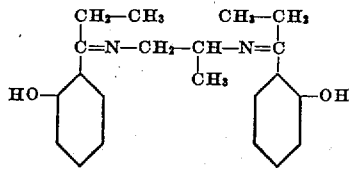

Di-(2-hydroxy-5-methyl-acetophenone)3,4-diaminohexane

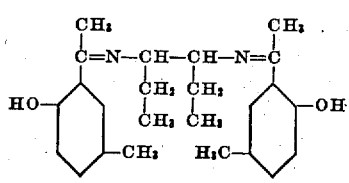

Di-(2-hydroxy-5-methyl-acetophenone)triethylenetetramine

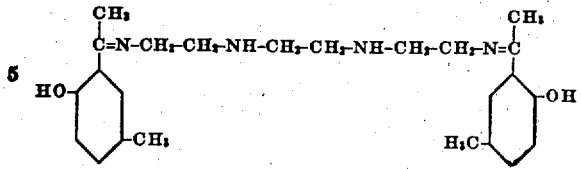

The quantity of copper deactivator added will be dependent upon the amount of copper present in the organic substance. At least one mol of copper deactivator must be added for each atom of copper in the organic substance. Preferably from about 1.5 to 100 mols of copper deactivator is used for each atom of copper in the organic substance or from about 5 to about 10 times the weight of the copper present. From about 0.0002 to about 0.01% of copper deactivator, based on the organic substance, will generally be satisfactory in most organic substances where the copper or copper compound is accidentally present. Higher ratios of copper deactivator, up to the limit of solubility of the deactivator in the organic substance, may be used, particularly when the organic substance is in contact with metallic copper in bulk which forms a reservoir of copper ions.

In order to avoid confusion arising from a superabundance of data, cracked gasoline has been selected as an example of an auto-oxidizable organic substance for illustrating the present invention. The samples employed were commercial blends of cracked and straight-run gasolines, completely refined but otherwise untreated with chemical agents such as dyes, anti-knock agents and anti-oxidants. p-Benzylaminophenol, sometimes hereinafter referred to as BAP, has been chosen as the representative gasoline antioxidant. As representative of a copper deactivator of our invention, we have chosen di-(2-hydroxy-5-methyl-acetophenone)-ethylenediamine. A representative copper catalyst is copper oleate. The concentrations of these materials as given in the following tables are given in weight percent in the gasoline, those for the copper catalyst being based on the content of copper rather than copper oleate.

The term "stabilized gasoline" is employed to denote gasoline to which has been added an antioxidant in sufficient quantity to significantly increase its induction period in the absence of added copper.

The aging of gasoline results in the formation of gum. When the gum content exceeds 10 mg. per 100 cc. as determined by the A. S. T. M. air jet method, the gasoline is considered unfit for use. When reference is made hereinafter to air jet gum, it will be understood that we refer to gum formed in gasoline as determined by such method.

The method, used for determining the induction periods given below, was the accelerated method developed by Voorhees & Eisinger (S. A. E. J. 24 584, 1929). It consists in heating 100 cc. of gasoline at 100° C. in a 1 liter Pyrex flask containing pure oxygen The internal pressure is observed every 10 minutes by means of a manometer attached to the system. The elapsed time from the start of the test until the gasoline begins to absorb oxygen at the rate of 10 cc. or higher per 10 minutes as shown by the fall in internal pressure, is taken as the induction period. It has been found that the induction period obtained by this method, although greatly shortened, is a fairly accurate measure of the relative stability of gasoline under normal storage conditions.

The magnitude of the catalytic effect is dependent upon the form of the copper as well as upon its concentration or the area of contact. The following substances were found to have readily measurable pro-oxidant effect: cupric chloride and oleate, metallic copper, cuprous and cupric oxides and cupric sulfide. Even Babbitt metal and aluminum alloys containing copper decrease the induction period of gasoline.

The presence of 0.1 part per million of soluble copper was detectable in a sample of unstabilized gasoline, while 1 p. p. m. decreased its induction period from 110 to 30 minutes.

The harmful effect of dissolved copper on gasoline stabilized with several different antioxidants is shown in Table I.

TABLE I

*The effect of dissolved copper*

| No. | Antioxidant | Conc. | Induction period in minutes | |
|---|---|---|---|---|
| | | | No added Cu | 1 p. p. m. Cu |
| 1 | None (control) | | 110 | 30 |
| 2 | Hardwood tar distillate | 0.025 | 260 | 60 |
| 3 | ...do... | 0.10 | | 230 |
| 4 | Catechol | 0.008 | 270 | 80 |
| 5 | ...do... | 0.025 | | 270 |
| 6 | Alpha-naphthol | 0.005 | 270 | 40 |
| 7 | ...do... | 0.0175 | | 270 |
| 8 | p-Benzylaminophenol (BAP) | 0.001 | 270 | 45 |
| 9 | ...do... | 0.0075 | | 110 |

It will be noted that the pro-oxidant effect of 1 p. p. m. of copper in the gasoline stabilized with the different antioxidants to 270 minutes induction period could only be overcome by the further addition of 7250 p. p. m. of hardwood tar distillate, 170 p. p. m. of catechol and 125 p. p. m. of alpha-naphthol, while it could not be overcome by the addition of 75 p. p. m. of BAP.

It is evident that the inhibiting effect of antioxidants is decreased by the copper and the method of overcoming the action of copper by the addition of larger amounts of antioxidants is not efficient. Even if the cost of additional antioxidant required be justified, other difficulties might arise due to the introduction of too much non-volatile matter into gasoline. The data presented in Table I must not be taken, however, to establish a fixed relative order of susceptibility of the antioxidants to copper. It has been found that the effect of copper varies in different samples of gasoline.

The effect of the addition of copper deactivators on a copper contaminated gasoline inhibited with BAP is shown in Table II.

TABLE II

*The effect of copper deactivators*

These data were obtained in a gasoline having the following properties:

Minutes induction period
Control (unstabilized) _____ 210
Plus 0.001% BAP _____ 330
Plus 0.001% BAP + 1 p.p.m. Cu_____ 30

The deactivators were tested in this gasoline containing 0.001% BAP and 1 p.p.m. Cu.

| No. | Deactivator | Conc. weight percent | Induction period, minutes |
|---|---|---|---|
| 1 | None | | 30 |
| 2 | Di-(2-hydroxy-acetophenone) ethylenediamine | 0.002 | 330 |
| 3 | Di-(2-hydroxy-5-methyl-acetophenone) ethylenediamine | 0.002 | 330 |
| 4 | Di-(2-hydroxy-(mixed 4 and 5)-methyl-acetophenone) ethylenediamine | 0.002 | 330 |
| 5 | Di-(2-hydroxy-propiophenone) ethylenediamine | 0.002 | 330 |
| 6 | Di-(2-hydroxy-5-methyl-acetophenone) 1,2-propylenediamine | 0.002 | 290 |
| 7 | Di-(2-hydroxy-propiophenone) 1,2-propylenediamine | 0.002 | 320 |
| 8 | Di-(2-hydroxy-5-methyl-acetophenone) 3,4-diaminohexane | 0.002 | 250 |
| 9 | Di-(2-hydroxy-5-methyl-acetophenone) 1,3-propylenediamine | 0.002 | 80 |
| 10 | Di-(2-hydroxy-5-methyl-acetophenone) hexamethylenediamine | 0.002 | 40 |
| 11 | Di-(2-hydroxy-5-methyl-acetophenone) decamethylenediamine | 0.002 | 40 |
| 12 | Di-(2-hydroxy-propiophenone) decamethylenediamine | 0.01 | 80 |
| 13 | Di-(2-hydroxy-5-methyl-acetophenone) (b-aminoethyl) sulfide | 0.002 | 50 |
| 14 | Di-(2-hydroxy-5-methyl-acetophenone) triethylenetetramine | 0.002 | 180 |

It will be noted that the most effective compounds are the condensation products of ortho-hydroxy aromatic ketones with aliphatic diamines having the amino groups on adjacent carbon atoms.

The copper deactivators do not possess true antioxidant effect. This is illustrated in Table III.

TABLE III

| No. | Conc.[1] BAP weight percent | Conc. Cu p.p.m. | Deactivator | Conc. weight percent | Induction period, minutes |
|---|---|---|---|---|---|
| 1 | None | None | None | | 210 |
| 2 | 0.001 | None | ...do... | | 330 |
| 3 | None | None | Di-(2-hydroxy-5-methyl-acetophenone)ethylenediamine | 0.005 | 210 |
| 4 | None | 1.0 | None | | 30 |
| 5 | 0.001 | 1.0 | ...do... | | 30 |
| 6 | None | 1.0 | Di-(2-hydroxy-5-methyl-acetophenone)ethylenediamine | 0.005 | 210 |
| 7 | 0.001 | 1.0 | Di-(2-hydroxy-5-methyl-acetophenone)ethylenediamine | 0.002 | 330 |

[1] BAP=P-benzylaminophenol.

It will be observed that the deactivator does not increase the induction period of the unstabilized gasoline (compare Nos. 1 and 3), and merely restores that of unstabilized gasoline containing copper to the value of the uncontaminated sample. (Compare Nos. 4, 6 and 1.) Nos. 2 and 5 are included merely for contrast.

Since the function of the deactivators is to suppress the catalytic activity of a given quantity of copper, an excess beyond that required for nearly complete deactivation is superfluous except that it renders the gasoline more resistant to further copper contamination. The concentration effect of a copper deactivator is shown in Table 4.

TABLE IV

These data were obtained with the sample of gasoline described in Table I containing 0.001% BAP and 1 p.m. Cu.

| No. | Deactivator | Induction period in minutes |   |   |   |   |   |
|---|---|---|---|---|---|---|---|
| 1 | Di-(2-hydroxy-5-methyl-acetophenone) ethylenediamine | 30 | 170 | 260 | 330 | 340 | 350 |
| 2 | Di-(2-hydroxy-4 & 5-methylacetophenone) ethylenediamine | 30 | 150 | 300 | 330 | | |
| Concentration of deactivator, weight percent | | 0.0 | 0.0005 | 0.001 | 0.002 | 0.005 | 0.01 |

Since the induction period of the gasoline, containing 0.001% BAP but no Cu, was 330 minutes, nearly complete deactivation occurred between 0.001 and 0.002% concentration of the deactivators, although their effect was noticeable at 0.0005%. It will be noted that the advantage gained by adding more than 0.002% was negligible. This behavior is unlike that of true antioxidants for which the concentration-induction period relationship is approximately rectilinear.

Other tests are given in the following Tables V and VI.

TABLE V

*The effect of copper deactivators*

These data were obtained in a gasoline having the following properties:

| | Minutes induction period |
|---|---|
| Control (unstabilized) | 220 |
| Plus 0.001% BAP | 400 |
| Plus 0.001% BAP + 1 p.p.m. Cu | 30 |

The deactivators were tested in this gasoline containing 0.001% BAP and 1 p.p.m. Cu.

| No. | Deactivator | Concentration, weight percent | Induction period, minutes |
|---|---|---|---|
| 1 | None | | 30 |
| 2 | Di-(2-hydroxy-5-methyl-acetophenone) ethylenediamine | 0.002 | Over 420 |
| 3 | Di-(2-hydroxy-5-methyl-acetophenone) 1,3-propylenediamine | 0.002 | 110 |
| 4 | Di-(2-hydroxy-5-methyl-acetophenone) 1,3-diamino-propanol-2 | 0.002 | 310 |

Some tests were also run in the same gasoline inhibited with alpha-naphthol. The results obtained are given in Table VI.

TABLE VI

These data were obtained in a gasoline having the following properties:

| | Minutes induction period |
|---|---|
| Control (unstabilized) | 220 |
| Plus 0.002% a-naphthol | 360 |
| Plus 0.002% a-naphthol + 1 p. p. m. Cu | 30 |

The reactivators were tested in this gasoline containing 0.002% a-naphthol and 1 p. p. m. Cu.

| No. | Deactivator | Conc. weight percent | Induction period, minutes |
|---|---|---|---|
| 1 | None | | 30 |
| 2 | Di-(2-hydroxy-5-methyl-acetophenone) ethylenediamine | 0.002 | 420 |
| 3 | Di-(2-hydroxy-5-methyl-acetophenone) 1,3-propylenediamine | 0.002 | 110 |
| 4 | Di-(2-hydroxy-5-methyl-acetophenone) diethylenetriamine | 0.002 | 270 |
| 5 | Di-(2-hydroxy-5-methyl-acetophenone) 1,3-diamino-2-methyl-propanol-2 | 0.002 | 330 |

It will be apparent that, in each case, the most effective deactivators are the condensation products of the ketones with alkylenediamines in which the amino groups are attached to adjacent carbon atoms, see Nos. 2 to 8 Table II, No. 2 Table V and No. 2 Table VI. Under the same conditions, the condensation products of alkylene-diamines, in which the amino groups are attached to non-adjacent carbon atoms, are much less effective, see Nos. 9 to 12 Table II, No. 3 Table V and No. 3 Table VI. However, when the primary amino groups are attached to non-adjacent carbon atoms of the polyamine, their effectiveness may be materially increased by introducing a hydroxy group on the aliphatic carbon chain or by introducing one or more secondary amino groups in the aliphatic chain, see No. 14 Table II, No. 4 Table V, and Nos. 4 and 5 Table VI.

The efficiencies of antioxidants, other than benzylaminophenol and a-naphthol, are also improved in the presence of copper by the addition of a copper deactivator of our invention. Although the effect of the copper deactivator on the efficiency of benzylaminophenol and a-naphthol only has been disclosed, similar results are obtainable with other antioxidants, such as other p-amino-phenol derivatives, catechol, pyrogallol, mesitol, the xylenols, p-hydroxyphenyl morpholine and hardwood-tar distillate. There is no reason to believe that any true antioxidant would fail to respond to this treatment.

The copper deactivators of this class are readily prepared by mixing the polyamine with the ketone in substantially molecular proportions at ordinary room temperature. Usually, a slight excess of the polyamine will be employed. The reaction takes place without a solvent. However, it is generally preferred to employ a solvent such as water or an organic solvent such as methyl and ethyl alcohols. Catalysts are unnecessary. While the reaction takes place readily at room temperature, it is frequently desirable to employ gentle heat to shorten the reaction period and to complete the reaction. The yields are practically quantitative and usually are above 90% of theory. The compounds are yellowish and many of them are relatively high melting. The reaction may be represented by the following equation showing the reaction between o-hydroxy acetophenone and ethylene diamine.

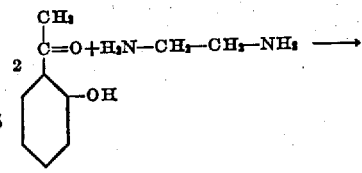

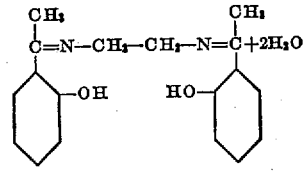

Unlike the usual antioxidants, these copper deactivators are resistant to the action of molecular oxygen and solutions of the deactivators may be kept in the presence of air for years without any apparent change. They are thermally stable but are destroyed by strong mineral acids.

The deactivators may be added in any form and manner to the oxidizable products to be protected. They may be in solid or liquid form, mixed with other addition agents or dissolved in a solvent. Aromatic amines, such as aniline and o-toluidine and phenols, such as mixed xylenols, are excellent solvents for the copper deactivators and may be employed to aid in the incorporation of the deactivators into the organic substances where desired. The deactivators may be added to the finished products or to the products at any stage in the process of manufacture. While we have disclosed tests illustrating the effect of our copper deactivators in cracked gasoline, these copper deactivators have been tested and found to be quite effective for suppressing the deleterious effect of copper and its salts in rubber and petroleum lubricating oils. We have also found copper deactivators to be effective in motor benzol, fuel oils, heating oils, animal fats and oils, vegetable fats and oils, edible oils, drying oils, soaps, photographic developers, gasoline antioxidants and vegetable juices. It is merely necessary to employ a copper deactivator which is soluble in the organic substance to be protected, avoiding conditions such as the presence of substantial amounts of strong mineral acids which would destroy the copper deactivator. Accordingly, our copper deactivators will be found to be effective in petroleum products and mineral hydrocarbons such as gasoline, kerosene, fuel oil, transformer oil, lubricating oil and the like; fats, waxes; animal and vegetable fats and oils, and derivatives obtained therefrom, such as soaps; sulfonated and sulfated oils, including alcohol sulfates; fruit and vegetable juices; essential oils; perfumes; cotton; silk; paper; wool; cellulose acetate; regenerated cellulose products; synthetic products, such as photographic developers, antioxidants, and conjugated dienes and their polymerization products, particularly chloroprene, "neoprene" and "neoprene" latex. The deactivators also function in solutions of such organic substances in different solvents, as well as in mixtures of such substances.

Our compounds cannot be assigned to specific classes of organic products as can be done with the different types of antioxidants. So long as the organic substance does not have a high mineral acid content destructive to the deactivator, the deactivator, upon solution in the organic substance will be effective to suppress the catalytic activity of copper present and hence our compounds will be operative in different classes of oxidizable organic substances.

Mixtures of deactivators may be used, as well as the condensation products of a given polyamine with a mixture of ketones, or a given ketone with a mixture of polyamines. Besides many others, the condensation products of the following ketones with each of the following polyamines are copper deactivators:

| Ketones | Polyamines |
|---|---|
| 2-hydroxyacetophenone | ethylenediamine |
| 2-hydroxy-4-methylacetophenone | 1,2-propylenediamine |
| 2-hydroxy-5-methylacetophenone | 2,3-butylenediamine |
| 2-hydroxy-5-methoxyacetophenone | 3,4-diaminohexane |
| 2-hydroxy-5-chloroacetophenone | 1,2-diphenylethylenediamine |
| 2-hydroxypropiophenone | 2,3-diaminopentane |
| 2-hydroxybutyrophenone | 1-phenylethylenediamine |
| 2-hydroxybenzophenone | 3-phenyl-1,2-propylenediamine |
| 2-hydroxy-5-methoxybenzophenone | 1,3-diamino-propanol-2 |
| 2-hydroxy-6-methylacetophenone | 1,3-diamino-2-methyl-propanol-2 |
| 2-acetonaphthol-1 | diethylenetriamine |
| 1-acetonaphthol-2 | triethylenetetramine |

The copper deactivators may be used in organic products containing other adjuvants, such as accelerators and softening agents in rubber, tetraethyl lead and dyes in gasoline, perfumes in soap, flavoring agents in fats and oils, and extreme pressure lubricants and anti-sludging agents in lubricating oil.

It is to be noted that not all condensation products of all ketones with organic polyamines are necessarily copper deactivators. Compounds, produced from ketones which do not contain a hydroxyl group attached to a carbon atom of the ring adjacent to the carbon to which the keto group is attached, have been found to have very little or no effect as copper deactivators.

Also, the copper deactivators of the present invention may be distinguished from the compounds of our copending application, Serial No. 182,375, filed December 29, 1937, now Patent 2,181,121 issued November 28, 1939, in that practically any polyamine may be reacted with the ortho-hydroxy aldehydes to produce an effective copper deactivator. Only certain classes of polyamines hereinbefore defined will yield desirably effective copper deactivators with the ketones.

From all of the above, it will be apparent that, by our invention, we have made it possible to stabilize many organic substances, susceptible to the harmful action of oxygen catalyzed by copper and its compounds, by the addition of one or more members of a class of compounds which suppress the harmful activity of the copper and its compounds. We have shown that the deactivator is effective alone or in combination with an amount of an antioxidant which is generally required to stabilize the products in the absence of copper. Thus, we have made it possible to effectively and economically stabilize organic substances by means of antioxidants even in the presence of copper and its compounds without it being necessary to employ large amounts of antioxidant to overcome the catalytic action of the copper.

While we have disclosed the preferred embodiments of our invention and the preferred modes of carrying the same into effect, it will be readily apparent to those skilled in the art that many variations and modifications may be made therein without departing from the spirit of our invention. Accordingly the scope of our invention is to be limited solely by the appended claims construed as broadly as is permissible in view of the prior art.

We claim:

1. The method of inhibiting the catalytic deterioration of an organic substance normally caused by copper and its compounds in the presence of oxygen which comprises incorporating in the organic substance a small proportion of a di-(o-hydroxy aromatic ketone) aliphatic polyamine free of strongly acidic groups obtained by condensing 1 mol of an aliphatic polyamine in which two amino groups are primary amino groups directly attached to aliphatic carbon atoms with 2 mols of an o-hydroxy substituted aromatic ketone, so that one mol of ketone reacts for each primary amino group of the amine.

2. The method of inhibiting the catalytic deterioration of an organic substance normally caused by copper and its compounds in the presence of oxygen which comprises incorporating in the organic substance a small proportion of a di-(o-hydroxy phenone) aliphatic diamine free of strongly acidic groups obtained by condensing 1 mol of an aliphatic diamine in which the amino groups are primary amino groups directly attached to aliphatic carbon atoms with 2 mols of an o-hydroxy substituted mixed alkyl-aromatic ketone of the benzene series, so that one mol of ketone reacts for each amino group of the amine.

3. The method of inhibiting the catalytic deterioration of an organic substance normally caused by copper and its compounds in the presence of oxygen which comprises incorporating in the organic substance a small proportion of a di-(o-hydroxy acetophenone) alkylene diamine obtained by condensing 1 mol of an alkylene diamine in which the amino groups are primary amino groups directly attached to adjacent aliphatic carbon atoms with 2 mols of o-hydroxy acetophenone, so that not more than one mol of ketone reacts for each primary amino group of the amine.

4. The method of inhibiting the catalytic deterioration of an organic substance normally caused by copper and its compounds in the presence of oxygen which comprises incorporating in the organic substance a small proportion of a di-(o-hydroxy phenone) ethylene diamine obtained by condensing 1 mol of ethylene diamine with 2 mols of an o-hydroxy substituted mixed alkyl-aryl ketone of the benzene series, so that one mol of ketone reacts for each amino group of the amine.

5. The method of inhibiting the catalytic deterioration of an organic substance normally caused by copper and its compounds in the presence of oxygen which comprises incorporating in the organic substance a small proportion of di-(2-hydroxy acetophenone) ethylene diamine.

6. The method of inhibiting the catalytic deterioration of an organic substance normally caused by copper and its compounds in the presence of oxygen which comprises incorporating in the organic substance a small proportion of di-(2-hydroxy-5-methyl-acetophenone) ethylene diamine.

7. The method of inhibiting the catalytic deterioration of petroleum hydrocarbons normally caused by copper and its compounds in the presence of oxygen which comprises incorporating in the petroleum hydrocarbons a small proportion of a di-(o-hydroxy aromatic ketone) aliphatic polyamine free of strongly acidic groups obtained by condensing 1 mol of an aliphatic polyamine in which two amino groups are primary amino groups directly attached to aliphatic carbon atoms with 2 mols of an o-hydroxy substituted aromatic ketone, so that one mol of ketone reacts for each primary group of the amine.

8. The method of inhibiting the catalytic deterioration of gasoline normally caused by copper and its compounds in the presence of oxygen which comprises incorporating in the gasoline a small proportion of a di-(o-hydroxy aromatic ketone) aliphatic polyamine free of strongly acidic groups obtained by condensing 1 mol of an aliphatic polyamine in which two amino groups are primary amino groups directly attached to aliphatic carbon atoms with 2 mols of an o-hydroxy substituted aromatic ketone, so that one mol of ketone reacts for each primary amino group of the amine.

9. The method of inhibiting the catalytic deterioration of an organic substance normally caused by copper and its compounds in the presence of oxygen which comprises incorporating in the organic substance a small proportion of an antioxidant normally effective to materially retard deterioration of the organic substance in the absence of copper and its compounds but which is less effective in the presence of copper and its compounds and a small proportion of a di-(o-hydroxy aromatic ketone) aliphatic polyamine free of strongly acidic groups obtained by condensing 1 mol of an aliphatic polyamine in which two amino groups are primary amino groups directly attached to aliphatic carbon atoms with 2 mols of an o-hydroxy substituted aromatic ketone, so that one mol of ketone reacts for each primary amino group of the amine.

10. An organic substance normally subject to catalytic deterioration caused by copper and its compounds in the presence of oxygen having incorporated therein a small proportion of a di-(o-hydroxy aromatic ketone) aliphatic polyamine free of strongly acidic groups obtained by condensing 1 mol of an aliphatic polyamine in which two amino groups are primary amino groups directly attached to aliphatic carbon atoms with 2 mols of an o-hydroxy substituted aromatic ketone, so that one mol of ketone reacts for each primary amino group of the amine.

11. An organic substance normally subject to catalytic deterioration caused by copper and its compounds in the presence of oxygen having incorporated therein a small proportion of a di-(o-hydroxy aryl ketone) alkylene diamine obtained by condensing 1 mol of an alkylene diamine in which the amino groups are primary amino groups directly attached to adjacent aliphatic carbon atoms with 2 mols of an o-hydroxy substituted mixed alkyl-aryl ketone, so that one mol of ketone reacts for each amino group of the amine.

12. Petroleum hydrocarbons normally subject to catalytic deterioration caused by copper and its compounds in the presence of oxygen having incorporated therein a small proportion of a di-(o-hydroxy aromatic ketone) aliphatic diamine free of strongly acidic groups obtained by condensing 1 mol of an aliphatic diamine in which the amino groups are primary amino groups directly attached to aliphatic carbon atoms with 2 mols of an o-hydroxy substituted aromatic ketone, so that one mol of ketone reacts for each amino group of the amine.

13. An organic substance normally subject to catalytic deterioration caused by copper and its compounds in the presence of oxygen having incorporated therein a small proportion of an antioxidant normally effective to materially retard deterioration of the organic substance in the absence of copper and its compounds but which is less effective in the presence of copper and its compounds and a small proportion of a di-(o-hydroxy aromatic ketone) aliphatic diamine free of strongly acidic groups obtained by condensing 1 mol of an aliphatic diamine in which the amino groups are primary amino groups directly attached to aliphatic carbon atoms with 2 mols of an o-hydroxy substituted aromatic ketone, so that one mol of ketone reacts for each amino group of the amine.

14. Petroleum hydrocarbons normally subject to catalytic deterioration caused by copper and its compounds in the presence of oxygen having incorporated therein a small proportion of an antioxidant normally effective to materially retard deterioration of the petroleum hydrocarbons in the absence of copper and its compounds but which is less effective in the presence of copper and its compounds and a small proportion of a di-(o-hydroxy aromatic ketone) aliphatic diamine free of strongly acidic groups obtained by condensing 1 mol of an aliphatic diamine in which the amino groups are primary amino groups directly attached to adjacent aliphatic carbon atoms with 2 mols of an o-hydroxy substituted aromatic ketone, so that one mol of ketone reacts for each amino group of the amine.

15. An organic substance normally subject to catalytic deterioration caused by copper and its compounds in the presence of oxygen having incorporated therein a small proportion of a di-(o-hydroxy phenone) aliphatic diamine free of strongly acidic groups obtained by condensing 1 mol of an aliphatic diamine in which the amino groups are primary amino groups directly attached to aliphatic carbon atoms with 2 mols of an o-hydroxy substituted mixed alkyl-aromatic ketone of the benzene series, so that one mol of ketone reacts for each amino group of the amine.

16. An organic substance normally subject to catalytic deterioration caused by copper and its compounds in the presence of oxygen having incorporated therein a small proportion of a di-(o-hydroxy phenone) alkylene diamine obtained by condensing 1 mol of an alkylene diamine in which the amino groups are primary amino groups directly attached to adjacent aliphatic carbon atoms with 2 mols of an o-hydroxy substituted mixed alkyl-aryl ketone of the benzene series, so that one mol of ketone reacts for each amino group of the amine.

17. An organic substance normally subject to catalytic deterioration caused by copper and its compounds in the presence of oxygen having incorporated therein a small proportion of a di-(o-hydroxy acetophenone) alkylene diamine obtained by condensing 1 mol of an alkylene diamine in which the amino groups are primary amino groups directly attached to adjacent aliphatic carbon atoms with 2 mols of o-hydroxy acetophenone, so that not more than one mol of aldehyde reacts for each primary amino groups of the amine.

18. An organic substance normally subject to catalytic deterioration caused by copper and its compounds in the presence of oxygen having incorporated therein a small proportion of a di-(o-hydroxy phenone) ethylene diamine obtained by condensing 1 mol of ethylene diamine with 2 mols of an o-hydroxy substituted mixed alkyl-aryl ketone of the benzene series, so that one mol of ketone reacts for each amino group of amine.

19. An organic substance normally subject to catalytic deterioration caused by copper and its compounds in the presence of oxygen having incorporated therein a small proportion of di-(2-hydroxy acetophenone) ethylene diamine.

20. An organic substance normally subject to catalytic deterioration caused by copper and its compounds in the presence of oxygen having incorporated therein a small proportion of di-(2-hydroxy-5-methyl-acetophenone) ethylene diamine.

21. Petroleum hydrocarbons normally subject to catalytic deterioration caused by copper and its compounds in the presence of oxygen having incorporated therein a small proportion of a di-(o-hydroxy aryl ketone) alkylene diamine obtained by condensing 1 mol of an alkylene diamine in which the two amino groups are primary amino groups directly attached to adjacent aliphatic carbon atoms with 2 mols of an o-hydroxy substituted mixed alkyl-aryl ketone, so that one mol of ketone reacts for each amino group of the amine.

22. Petroleum hydrocarbons normally subject to catalytic deterioration caused by copper and its compounds in the presence of oxygen having incorporated therein a small proportion of a di-(o-hydroxy acetophenone) alkylene diamine obtained by condensing 1 mol of an alkylene diamine in which the amino groups are primary amino groups directly attached to adjacent aliphatic carbon atoms with 2 mols of o-hydroxy acetophenone, so that not more than one mol of ketone reacts for each primary amino group of the amine.

23. Petroleum hydrocarbons normally subject to catalytic deterioration caused by copper and its compounds in the presence of oxygen having incorporated therein a small proportion of a di-(o-hydroxy phenone) ethylene diamine obtained by condensing 1 mol of ethylene diamine with 2 mols of an o-hydroxy substituted mixed alkyl-aryl ketone of the benzene series, so that one mol of ketone reacts for each amino group of the amine.

24. Petroleum hydrocarbons normally subject to catalytic deterioration caused by copper and its compounds in the presence of oxygen having incorporated therein a small proportion of di-(2-hydroxy acetophenone) ethylene diamine.

25. Petroleum hydrocarbons normally subject to catalytic deterioration caused by copper and its compounds in the presence of oxygen having incorporated therein a small proportion of di-(2-hydroxy-5-methyl-acetophenone) ethylene diamine.

26. Gasoline normally subject to catalytic deterioration caused by copper and its compounds in the presence of oxygen having incorporated therein a small proportion of a di-(o-hydroxy aromatic ketone) aliphatic polyamine free of strongly acidic groups obtained by condensing 1 mol of an aliphatic polyamine in which two amino groups are primary amino groups directly attached to aliphatic carbon atoms with 2 mols of an o-hydroxy substituted aromatic ketone, so that one mol of ketone reacts for each primary amino group of the amine.

27. Gasoline containing lead tetra ethyl stabilized by addition of a small quantity of the condensation product of a hydroxy aromatic ketone and an aliphatic polyamine containing at least two primary amine groups.

28. The method of inhibiting the catalytic deterioration of an organic substance normally caused by copper and its compounds in the presence of oxygen which comprises incorporating in the organic substance a small proportion of di-(2-hydroxy-5-methyl-acetophenone) 1,2-propylene diamine.

29. An organic substance normally subject to catalytic deterioration caused by copper and its compounds in the presence of oxygen having incorporated therein a small proportion of di-(2-hydroxy-5-methyl-acetophenone) 1,2-propylene diamine.

30. Petroleum hydrocarbons normally subject to catalytic deterioration caused by copper and its compounds in the presence of oxygen having incorporated therein a small proportion of di-(2-hydroxy-5-methyl-acetophenone) 1,2-propylene diamine.

FREDERICK B. DOWNING.
CHARLES J. PEDERSEN.